UNITED STATES PATENT OFFICE.

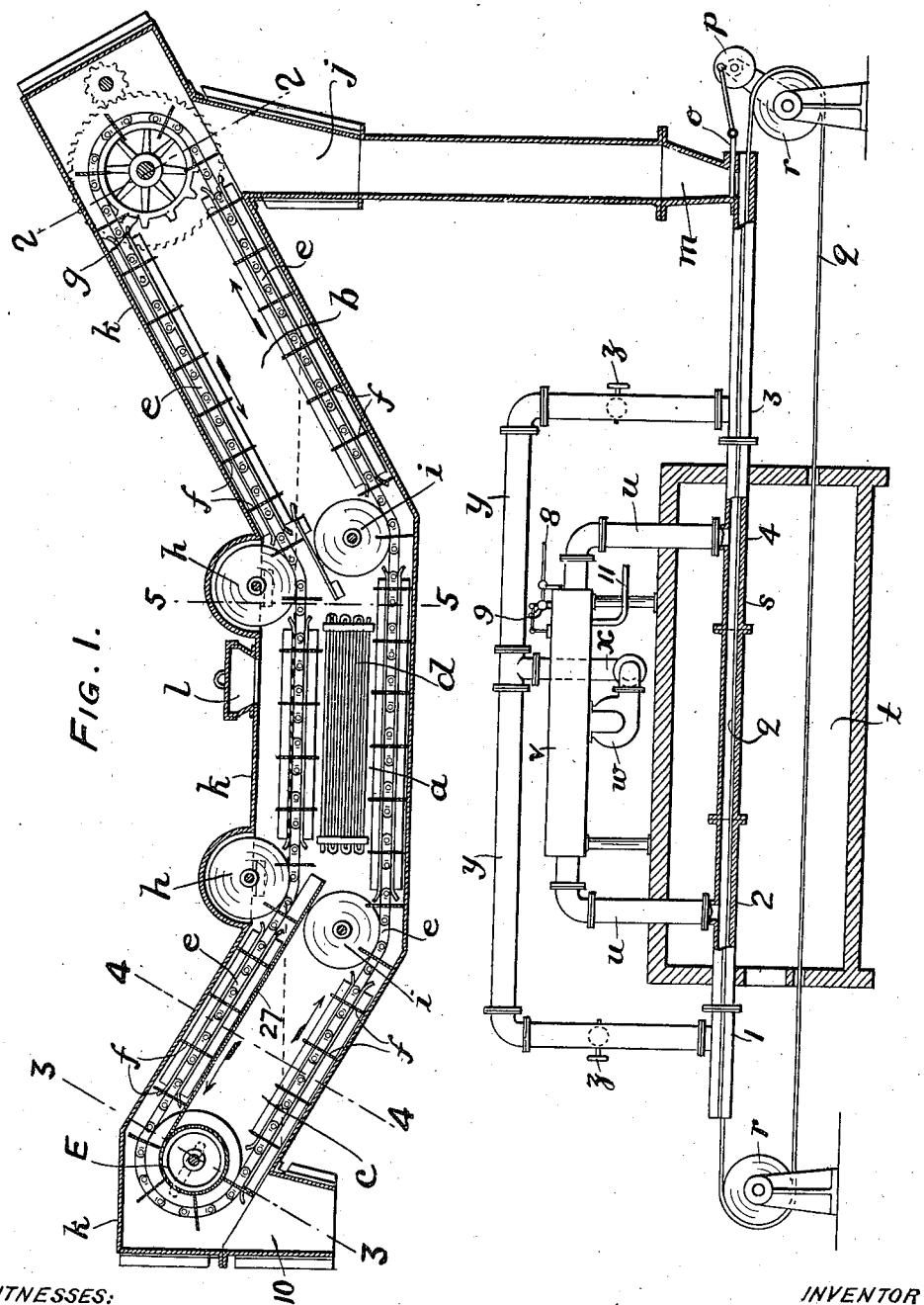

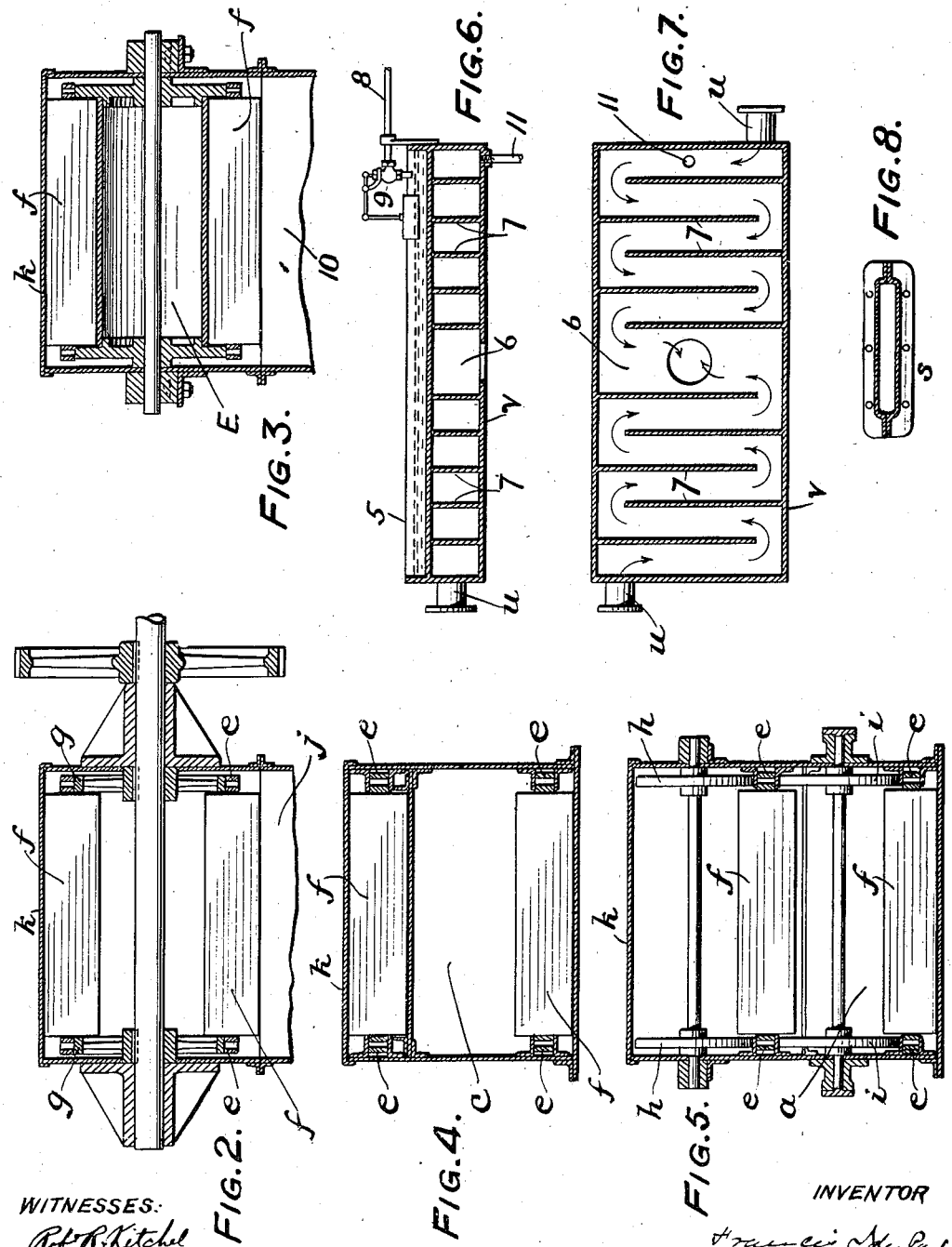

FRANCIS I. du PONT, OF WILMINGTON, DELAWARE.

LIQUID ORE SEPARATION.

1,014,624.   Specification of Letters Patent.   Patented Jan. 9, 1912.

Application filed December 1, 1909. Serial No. 530,761.

*To all whom it may concern:*

Be it known that I, FRANCIS I. DU PONT, a citizen of the United States, residing at Wilmington, county of Newcastle, and State of Delaware, have invented a new and useful Improvement in Liquid Ore Separation, of which the following is a full, clear, and exact description.

My invention consists in certain improvements in gravity separation of solids.

My invention consists in passing the material to be separated into a bath formed of a salt, which salt is in a liquid, semi-liquid, or fused condition. The salt may be in a liquid or semi-liquid condition, one which requires heat to render it liquid or semi-liquid, or to maintain the salt in a liquid or semi-liquid condition. The salt should be anhydrous and volatilizable. As an example, I have used anhydrous antimony bromid. In practice, I form a bath of this salt, into which the mixture to be separated is passed into this liquid, where it is separated into its constituents. The higher and heavier constituents are separately removed and any of the salt adhering thereto volatilized, condensed and returned to the separating tank.

I will now describe an apparatus with which my invention may be carried out.

Figure 1 is a vertical section through a separator and treating furnace partially shown in elevation. Fig. 2 is a section on line 2—2 of Fig. 1. Fig. 3 is a section on line 3—3 of Fig. 1. Fig 4 is a section on line 4—4 of Fig. 1. Fig. 5 is a section on line 5—5 of Fig. 1. Fig. 6 is a vertical section of the condenser showing the float valve in elevation. Fig. 7 is a horizontal section of the condenser. Fig. 8 is a cross section of the guide which passes through the furnace.

*a, b, c,* is a tank, *a* being a central horizontal portion, *b* being an inclined portion at one end of the central horizontal portion, and *c* being an inclined portion projecting from the other end of the central horizontal portion. In this tank is a salt, for instance, bromid of antimony, as the separating salt.
If the salt to be used is one which is not a liquid at ordinary temperature, I prefer to provide in the tank the heating coils *d*. In this tank are the conveyer chains *e*, between which are flights *f* formed of rectangular plates. These conveyer chains are driven by the sprocket wheels *g* and are guided by the rollers *h* and *i*. The diameter of the sprocket *g*, the rollers *h* and the position of the rollers *i* are such that in the portion *a* of the tank one section of the conveyer is at the upper portion of the liquid and the other section of the conveyer is at the lower portion of the liquid. The conveyer travels in the direction of the arrow and at a slow speed.

In order to prevent the deleterious effect of any fuming where the liquid fumes are all at ordinary temperatures, it is advisable in practice to provide a cover *k* for the tank. This cover is provided with an opening *l* about central of the horizontal section *a* of the tank, through which opening the material is fed into the tank.

By specific gravity the constituents separate, the heavier falling to the bottom and the lighter remaining in the upper portion. The conveyer, which in its travel moves quite slowly, in the lower section, by means of the flights catches the heavier constituents, drawing them up the incline *b*. The salt carried by the flights, when the flights pass beyond the liquid level of the tank, will pass off from the flights, and the solid constituents, although the salt has drained off, will still be impregnated with it, and will be carried to a point where the chute *j* opens, through which they may be discharged. The flights on the upper section of the chain will catch and carry with them the light constituents, carrying them up the incline *c*, and when the flights have reached a point above the liquid the same will pass from them. The inclined bottom 27 and roller E will prevent the escape of the solids until the flights have passed around the roller when, being uncovered, they aline with the chute 10.

In order to remove any salt carried by the constituents and recover the same I use the following construction. The material may be carried or fed from the chutes *j* into a hopper *m*. The bottom of this hopper may be provided with a slide *o* normally closed and operated by an eccentric *p*, the operation of which allows graded quantities to pass out of the mouth of the hopper. *q* is an iron band caused to travel around the rollers *r* by appropriate means. Its movement should be quite slow. This band *q* passes through a cast iron passage *s*, shown in section, Fig. 8. This cast iron passage *s* extends to and through a furnace *t* which may be heated by any appropriate means. The hottest part of this furnace is in the center and from that part extend two pipes $u$ which lead to a condenser $v$. From the middle part of this condenser the vapors are drawn off by means of a fan $w$ and discharged into the pipe $x$. This pipe $x$ has two pipe connections $y$ extending to the cast iron passage outside of the point from which the pipes $u$ are led and at a little distance from said pipes $u$. Upon the pipes $y$ are the dampers $z$. By means of the dampers $z$ the amount of air which passes through each of the pipes $y$ may be adjusted each in its relation to the other. By this arrangement, it will be noticed that the circulation is so arranged that in the hottest part of the recovery apparatus there is no circulation in either direction and practically a dead space. The purpose of this is that the circulation of air may not interfere with the heating effect which is desired.

It will be noted that the pipes $y$ deliver the air into parts of the apparatus cooler than those from which the air passes by the pipes $u$. This also avoids a loss of heat and in addition to this has the effect of subjecting hot pieces of ore to a draft which has been freed to a great extent from the vapors of the liquid which it is desired to recover.

The band $q$, passing through the cast iron conduit $s$, would, without the construction described, carry a certain amount of air with it, which, if it was allowed to pass through freely, might result in a possible loss of salt. By properly arranging and adjusting the dampers $z$, an exact balance may be obtained and thus prevent any outside air being allowed to circulate through this cast iron conduit $s$. This is accomplished by adjusting the amount of air which would tend to pass from 1 to 2 in its relation to the amount of air which would tend to pass from 3 to 4, so that the friction of these amounts of air in the conduit will exactly counterbalance any tendency of the air to be carried in or out of the cast iron conduit $s$ at its ends.

The condenser which I use is constructed as follows. It is a rectangular vessel having an open top forming a water pan 5 and a lower section 6, through or in which are formed zig zag conduits 7, so that the air and vapors which pass into the condenser through the pipes $u$ follow the course indicated by the arrows, the divisions insuring a long conduit in contact with the bottom of the water pan, which water pan acts as condenser. This pan is kept full of water but is not supplied with any overflow. It is filled with water by means of the pipe 8 and is regulated to keep the tank full by means of the float valve 9. This water is allowed to heat to its boiling point or even to boil, so that the condenser is prevented from reaching a point above the boiling point of water, which is the condition desired when the separating salt used is such as bromid of antimony, which becomes liquid at 93° C., but whose point of volatilization is much higher. Were the condenser kept cool and at a low point of temperature, the material would solidify in it and make handling of the same awkward.

With the arrangement described, the material is maintained as a liquid and passes out through the pipe 11 as a liquid. This pipe 11 may be at any point on the bottom of the condenser and may extend to the tank to return the liquid recovered to the body of separating liquid. The material passing through chute 10 may be treated in a similar manner to remove, recover and return its carried salt.

The above described apparatus is illustrated, described and claimed in an application filed by me February 2nd, 1910, Serial No. 541,545, and is not herein claimed.

Having now fully described my invention, what I claim and desire to protect by Letters Patent is:—

1. The process of separating solids of different specific gravities, consisting in liquefying anhydrous antimony bromid, passing the mixture to be separated therethrough and separately discharging the portions which float and those which sink.

2. The process of separating solids of different specific gravities consisting in liquefying anhydrous antimony bromid, passing the mixture to be separated therethrough, and separately discharging the portions which float and those which sink, vaporizing the liquid carried by the separated constituents, condensing the same, and returning said solution to the original separating liquid.

3. The process of separating solids of different specific gravities, consisting in passing the mixture to be separated through a bath consisting of an anhydrous volatilizable salt in a liquid condition and separately discharging the portions which float and those which sink, and volatilizing any salt carried off by the separated constituents, the volatilizing point of the salt being below the vaporizing point of the constituents to be separated.

4. The process of separating solids of different specific gravities, consisting in passing the mixture to be separated through a bath consisting of an anhydrous volatilizable salt in a fused condition and separately discharging the portions which float and those which sink, and volatilizing any salt carried off by the separated constituents, the volatilizing point of the salt being below the vaporizing point of the constituents to be separated.

5. The process of separating solids of different specific gravities, consisting in passing the mixture to be separated through a bath consisting of a volatile anhydrous salt maintained in a fused condition, separately discharging the portions which float and those which sink, vaporizing from each discharged constituent the liquid carried thereby, condensing said liquid and returning the same to the initial separating liquid.

6. The process of separating solids of different specific gravities, consisting in passing the mixture to be separated through a bath consisting of a volatile anhydrous salt in a liquid condition, separately discharging the portions which float and those which sink, vaporizing from each discharged constituent the liquid carried thereby, condensing said liquid and returning the same to the initial separating liquid.

In testimony of which invention, I have hereunto set my hand, at Philadelphia, on this 26th day of November, 1909.

FRANCIS I. DU PONT.

Witnesses:
M. M. HAMILTON,
A. M. URIAN.